(12) United States Patent
Cahoon et al.

(10) Patent No.: US 8,723,693 B1
(45) Date of Patent: May 13, 2014

(54) SYSTEM FOR AND METHOD OF INDICATING PREDICTIVE WINDSHEAR TRANSMITTER STATUS

(75) Inventors: James D. Cahoon, Melbourne, FL (US); Mark B. Godfrey, Melbourne, FL (US); Venkata A. Sishtla, Marion, IA (US); Jeffery A. Finley, Cedar Rapids, IA (US); Jason E. Smithe, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 328 days.

(21) Appl. No.: 13/228,278

(22) Filed: Sep. 8, 2011

Related U.S. Application Data

(63) Continuation-in-part of application No. 13/174,202, filed on Jun. 30, 2011.

(51) Int. Cl.
*G08B 23/00* (2006.01)
(52) U.S. Cl.
USPC .......................... 340/968; 340/945; 340/963
(58) Field of Classification Search
USPC ........................................................ 340/968
See application file for complete search history.

(56) References Cited

U.S. PATENT DOCUMENTS

| | | | |
|---|---|---|---|
| 6,636,786 B2 * | 10/2003 | Partel | 701/3 |
| 7,557,735 B1 * | 7/2009 | Woodell et al. | 340/968 |
| 2003/0078704 A1 * | 4/2003 | Partel | 701/3 |
| 2004/0119603 A1 | 6/2004 | Bohlander et al. | |
| 2005/0125117 A1 | 6/2005 | Breed | |

OTHER PUBLICATIONS

RTCA DO-220, Minimum Operational Performance Standards for Airborne Weather Radar with Forward-Looking Windshear Capability, Foreword, Table of Contents, Purpose and Scope, Sep. 21, 1993, 17 pages.
Office Action for U.S. Appl. No. 13/174,202, mail date Oct. 4, 2013, 8 pages.

* cited by examiner

*Primary Examiner* — Travis Hunnings
(74) *Attorney, Agent, or Firm* — Donna P. Suchy; Daniel M. Barbieri

(57) ABSTRACT

A system and method for indicating a predictive windshear transmission status is provided. The method includes determining if the predictive windshear radar system is transmitting. The method also includes providing an indication of the determination to a user interface device. Additional parameters, such as the operational state of the aircraft, may be used to further define when the indication is provided.

20 Claims, 5 Drawing Sheets

SYSTEM FOR AND METHOD OF INDICATING PREDICTIVE WINDSHEAR TRANSMITTER STATUS

CROSS-REFERENCE TO RELATED APPLICATIONS

The present application is a continuation-in-part of U.S. patent application Ser. No. 13/174,202 entitled, "System and Method for Indicating Windshear System Readiness," and filed on Jun. 30, 2011, the entirety of which is hereby incorporated by reference.

BACKGROUND

The present disclosure relates generally to the field of aircraft radar systems. The present disclosure more specifically relates to the field of predictive windshear radar systems.

Weather radar systems and windshear detection systems are often used in the field of avionics to sense weather and other potential hazards for an aircraft. For example, an onboard weather radar system may be used by a pilot to identify and avoid a storm front. Windshear is another potential hazard and can affect the trajectory of the aircraft, particularly during takeoffs and landings.

Currently, many windshear detection systems are automatically activated based on the operational state of the aircraft, due to the dangers of windshear during takeoffs and landings. For example, a typical windshear detection system may be automatically enabled when the aircraft is in the air and below an above-ground altitude of 2,300 feet. On the ground, the windshear detection system may also be automatically activated based on certain aircraft parameters, such as whether the thrust lever is set for takeoff. However, current windshear detection systems only provide warnings when windshear hazards are detected, making the status of these systems difficult to be determined by the pilot and others when windshear hazards are not actually detected. Applicants have discovered that there may be a need to provide an indication of the transmission status of the windshear detection system.

SUMMARY

One embodiment of the present disclosure relates to a method of providing a transmission status of a predictive windshear radar system for an aircraft. The method includes determining if the predictive windshear radar system is transmitting. The method also includes providing an indication of a result of the determining step to a user interface device.

Another embodiment of the present disclosure relates to a system for an aircraft. The system includes processing electronics configured to provide an indication of whether a predictive windshear radar system is transmitting to a user interface device.

A further embodiment of the present disclosure relates to one or more computer-readable media having instructions stored therein. The instructions are executable by one or more processors to execute a method. The method includes determining if a predictive windshear radar system is transmitting. The method also includes providing an indication of a result of the determining step to a user interface device.

DETAILED DESCRIPTION

Referring generally to the Figures, systems and methods for indicating a predictive windshear transmitter status are described. Weather fronts, jet streams, mountains, and other sources can lead to windshear, an atmospheric condition in which the velocity and direction of the wind is non-uniform over small regions of space. For aircraft, windshear can affect the trajectory of the aircraft, leading to turbulence. At low altitudes, windshear due to microbursts from weather fronts can be particularly hazardous for aircraft. Regulatory agencies, such as the U.S. Federal Aviation Administration, now require that all commercial aircraft have windshear detection systems. Typically, these systems are automatically activated based on the operational state of the aircraft (e.g., taking off, landing, etc.) and provide warnings if windshear is detected.

When the aircraft is airborne, the transmission status of a typical windshear detection system is not known by a pilot until windshear is detected. For example, many windshear detection systems automatically activate during landings when an aircraft is below an above-ground altitude of 2,300 feet. However, windshear alerts are not provided by these systems until the aircraft actually reaches an above-ground altitude of 1,200 feet. This means that the pilot may not be aware that the windshear detection system is operating normally until a windshear alert is provided. Similarly, when the aircraft is on the ground, ground crew and other personnel should maintain a safe distance from transmitting radar equipment. For these and other reasons, there exists a need for providing an indication of the transmission status of windshear detection systems.

To provide an indication of when a windshear detection system is transmitting, processing electronics are configured to determine when the radar in the windshear detection system is transmitting. The processing electronics are also configured to provide an indication of the determination to a user interface device. The user interface device may be any number of devices that convey sensory (e.g., visual, auditory, tactile, etc.) information to a user from the processing electronics. For example, providing the indication may involve causing an icon to appear on a display, changing the appearance of a displayed icon, causing the display or portion of the display to flash, illuminating a lamp, changing the color of light produced by a lamp, generating a sound via an audio device, and other ways of conveying sensory information to a user, according to various embodiments. Providing an indication of transmission status thereby allows pilots and other individuals to better monitor the operation of the aircraft windshear detection system.

Figure 1:
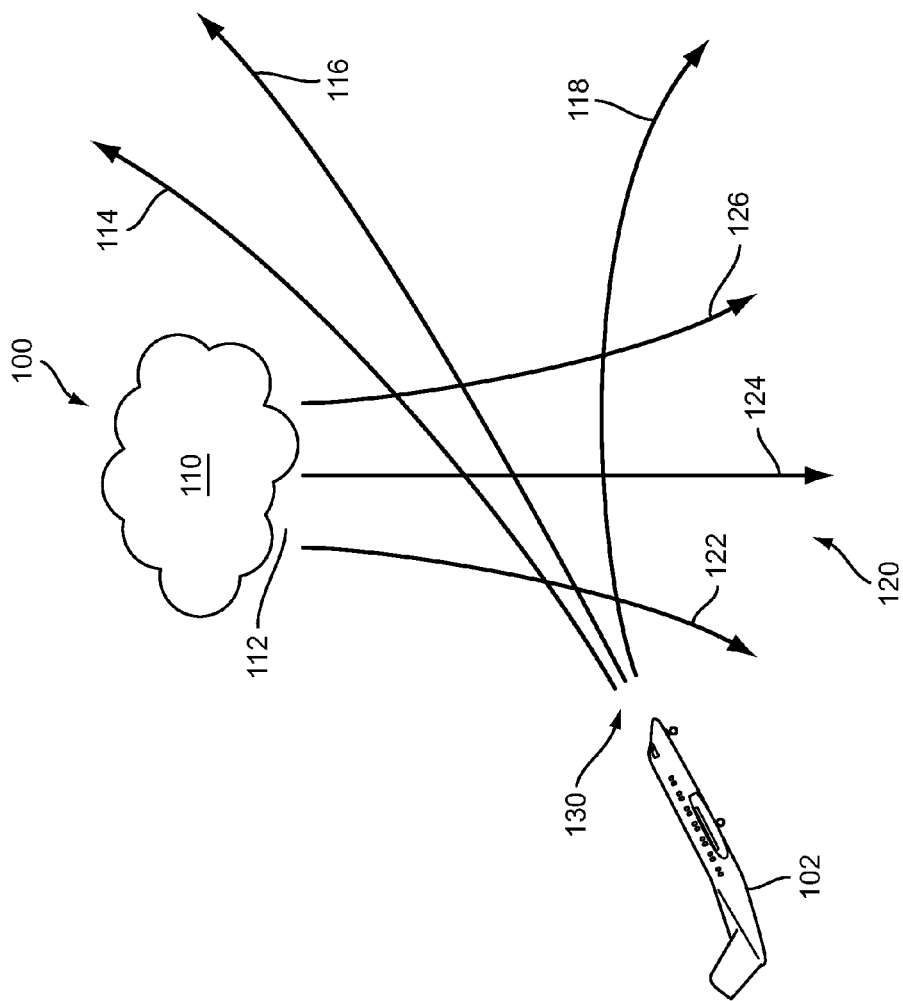
FIG. 1 is a schematic illustration of an aircraft encountering a windshear event during takeoff, according to an exemplary embodiment.
Figure 1:
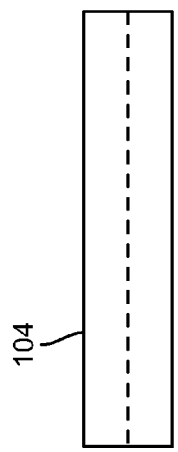

Referring now to FIG. 1, a windshear event 100 is depicted, according to an exemplary embodiment. A storm system 110 may create rain 112 accompanied by microbursts 120 at lower altitudes. Microbursts 120 travel at different velocities and in different directions, thereby creating windshear. For example, microbursts 120 may include headwind 122, downdraft 124, and tailwind 126, each differing in speed and direction. Microbursts pose the greatest danger to aircraft during takeoffs and landings, since a pilot has little time or room to adapt to the sudden changes in wind speed and direction.

As shown, aircraft 102 may be proceeding, for example, along a climb trajectory 116 after takeoff from runway 104. At point 130, aircraft 102 may begin to experience the effects of windshear event 100. For example, aircraft 102 may first encounter headwind 122, which causes a sudden increase in airspeed, thereby also increasing the lift of aircraft 102. If the pilots of aircraft 102 are unaware that this speed increase is caused by windshear event 100, they are likely to react by reducing engine power in order to maintain their current speed. However, as aircraft 102 passes through windshear event 100, the wind may quickly become downdraft 234 and tailwind 236. These winds reduce the speed of air over the wings of aircraft 102 from that of headwind 122, and the extra lift and speed provided by headwind 122 vanish. Because aircraft 102 is flying near stall speed after takeoff, aircraft 102 may be vulnerable to a sudden loss of airspeed and altitude if the pilots reduced engine power to account for headwind 122. Such a loss of airspeed and altitude may change the trajectory of aircraft 102 from climb trajectory 116 to trajectory 118, leading to a potential crash.

One way for the pilots of aircraft 102 to avoid microbursts 230 is to preemptively alter the trajectory of aircraft 102 before it encounters windshear event 100. For example, if the pilots of aircraft 102 are alerted to the presence of windshear event 100 in a timely manner, they may alter the trajectory of aircraft 102 from climb trajectory 116 to that of windshear avoidance trajectory 114, thereby avoiding microbursts 230. For this reason, many aircraft are equipped with windshear detection systems that become automatically activated before an aircraft leaves the ground.

There are two kinds of systems which are used to alert pilots to windshear conditions: reactive systems and predictive systems. Reactive windshear detection systems use an aircraft's in situ instrumentation to estimate the rate of change in the horizontal winds, to measure downdraft strength, and to measure the speed of the aircraft. These measurements are then used to determine if the aircraft is within a windshear event and to determine an appropriate escape path. However, reactive systems require the aircraft to be within a windshear event, for detection to occur. At higher altitudes, reactive systems may be used, since the hazardous effects of windshear are lessened.

At lower altitudes, such as those during takeoffs and landings, a predictive windshear (PWS) system may be used to preemptively avoid windshear conditions. PWS systems operate by estimating the airflow in front of aircraft, allowing detection of a potential windshear before the aircraft encounters it. For example, a microwave radar may be used to send a radar signal ahead of aircraft 102 to detect raindrops and other moisture particles from storm system 110. The return signal allows the motion of the raindrops and moisture particles to be tracked, thereby allowing allowing the PWS system of aircraft 102 to estimate the speeds and directions of wind in front of aircraft 102. These estimations are then used to predict if a windshear condition exists. This allows the trajectory of aircraft 102 to be altered before aircraft 102 begins to experience the effects of windshear. For this reason, PWS systems are commonly used in commercial aircraft during takeoffs and landings.

Figure 2:
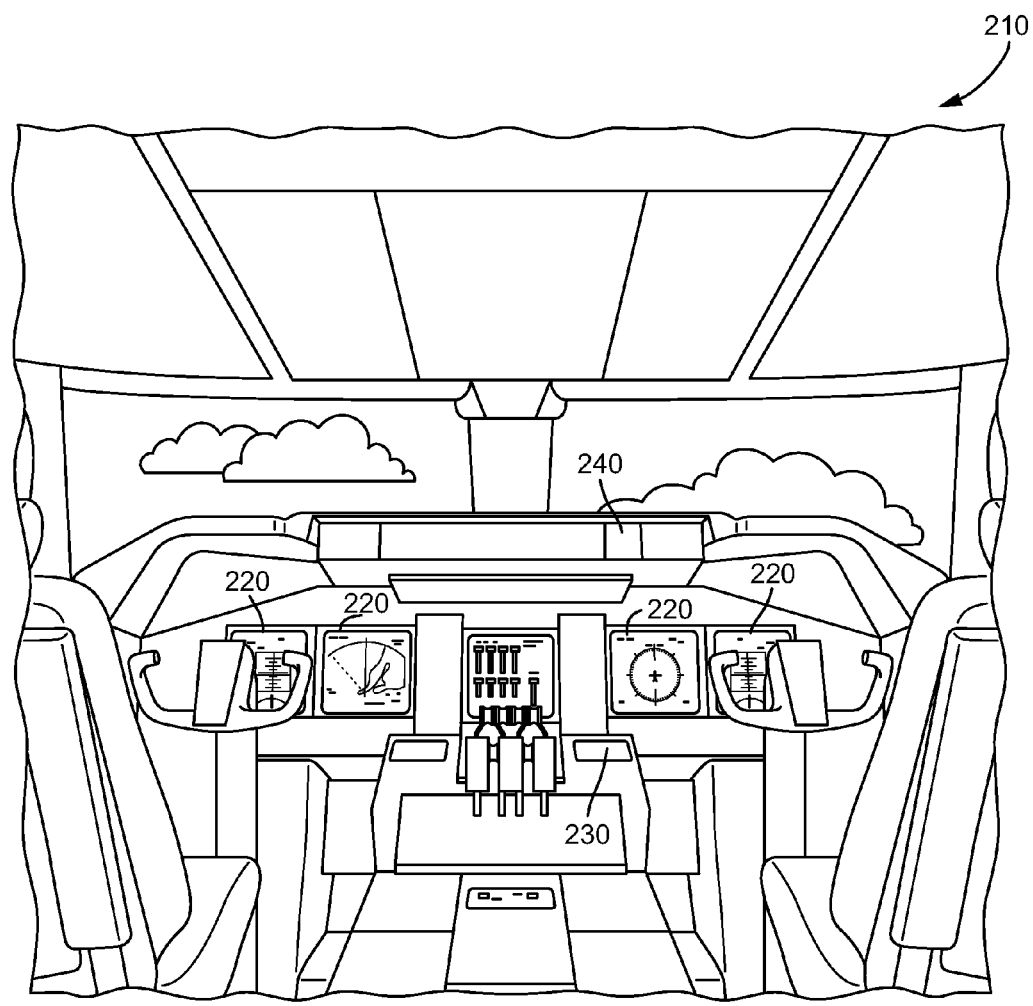
FIG. 2 is a perspective view schematic illustration of an aircraft control center, according to an exemplary embodiment.

Referring now to FIG. 2, an illustration of an aircraft control center 210 of aircraft 102 is shown, according to an exemplary embodiment. Aircraft control center 210 may include one or more user interface devices that convey information about the PWS system of aircraft 102. For example, PWS information, such as the detection of windshear, may be conveyed via a display 220, audio device 230, or lamp 240. Some or all of the user interface devices that convey PWS information may be external to aircraft control center 210 and may even be external to aircraft 102. For example, PWS information may be conveyed to a portable electronic device, a headset worn by a member of the ground crew, a computing device located in the control tower, or any other electronic device capable of conveying PWS information to a user.

In one example, display 220 may generally be used to increase the visual range and to enhance decision-making abilities, such as providing an output from a radar system of aircraft 102 to the pilots. A radar output may include a top-down view, a horizontal view, or any other view of weather and/or terrain detected by a radar system of aircraft 102. The views of weather and/or terrain may include monochrome or color graphical representations of the weather and/or the terrain. Graphical representations of weather or terrain may also include an indication of altitude of those objects or the altitude relative to aircraft 102.

In some embodiments, PWS information may include information about the transmission status of the PWS system. In general, the transmission status of the PWS system may be divided into the general categories of "TRANSMITTING" and "NOT TRANSMITTING." For example, lamp 240 may be illuminated when the PWS system of aircraft 102 is transmitting. In another example, a headset worn by a member of the ground crew may produce a sound when the radar of the PWS system is transmitting. In other embodiments, the operational state of aircraft 102 may be used to further subclassify the transmission status of the PWS system. For example, classifications such as "TRANSMITTING/ GROUND," "TRANSMITTING/AIR," "NOT TRANSMITTING/GROUND," and "NOT TRANSMITTING/AIR," may be used to denote whether or not the PWS system is transmitting and whether or not aircraft 102 is on the ground. In various embodiments, the different classifications may be indicated to the pilots via various aural, visual, and/or other sensory indicators.

Figure 3A:
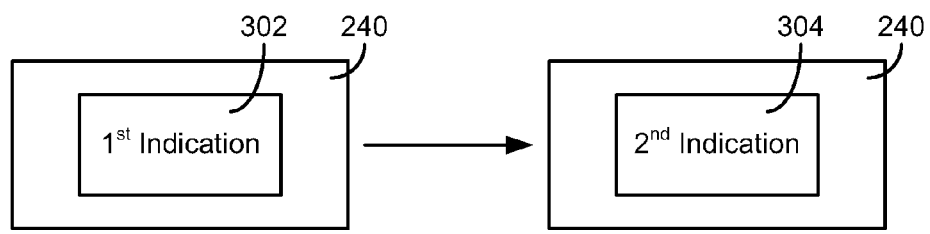
FIGS. 3A-C are illustrations of user interface devices conveying predictive windshear transmission status information, according to exemplary embodiments.
Figure 3B:
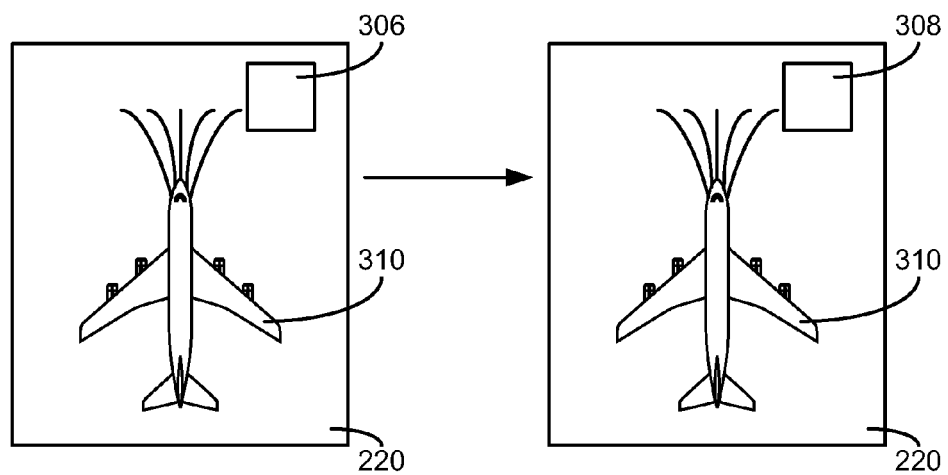
Figure 3C:
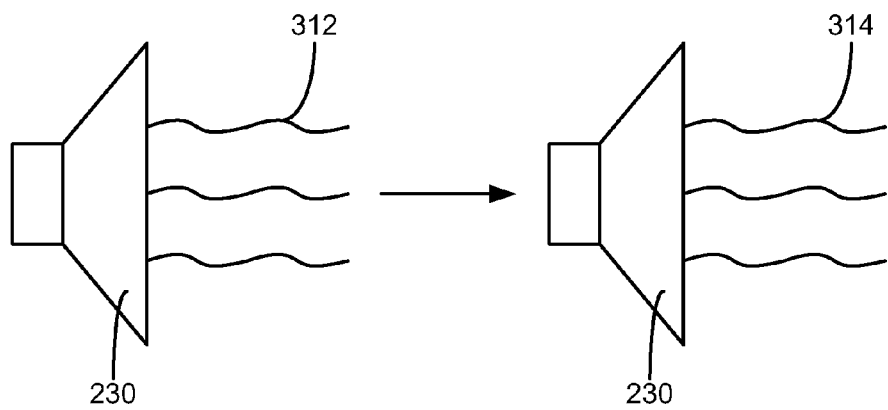

Referring now to FIGS. 3A-C, various forms of user interface devices conveying PWS information are shown, according to exemplary embodiments. As shown, the user interface devices transition from providing a first indication to a second indication, based on the transmission status of the PWS system. This allows a user of an interface device to monitor the operation of the PWS system. In some cases, a combination of user interface devices may be used to convey information about the PWS system. For example, an indication that the PWS system is transmitting may be provided to both display 220 and to audio device 230.

In FIG. 3A, lamp 240 transitions from providing a first indication 302 to providing a second indication 304, based on the transmission status of the PWS system. Lamp 240 may be, for example, an incandescent bulb, a light-emitting diode (LED), a halogen-based bulb, another form of light source, or any combination thereof. First indication 302 is associated with a first transmitter status and may be an illumination of lamp 240, the absence of illumination by lamp 240, or a coloration of lamp 240 associated with the status. Similarly, second indication 304 is associated with a second transmitter status and may also be an illumination of lamp 240, the absence of illumination by lamp 240, or a different coloration of lamp 240 associated with the second status.

In some embodiments, first indication 302 and second indication 304 provide indications only as to whether or not the PWS system is transmitting. For example, lamp 240 may be illuminated if the PWS system is transmitting (e.g., providing indication 302) and turned off when the PWS system is not transmitting (e.g., providing indication 304). In other embodiments, first indication 302 and second indication 304 may be based on both the PWS transmission status and another status, such as the operational status of the aircraft. For example, first indication 302 may be a red coloration if the PWS system is transmitting from the ground and second indication 302 may be a yellow coloration if the PWS sytem is transmitting from the air. In further embodiments, lamp 240 may provide additional indications to accommodate any number of additional statuses (e.g., a third coloration if the PWS system is not transmitting from the ground, etc.).

In FIG. 3B, display 220 is shown to transition from providing a first indication 306 to providing a second indication 308, based on the transmission status of the PWS system. Display 220 may be, for example, a radar display screen, a computer display, a touchscreen display, or any other form of electronic display. First indication 306 and second indication 308 may be displayed indicia (e.g., icons, text, flashing graphics, shapes, colors, etc.) on display 220 or even a lack thereof. In some embodiments, first and second indications 306 and 308 may also be provided in addition to other indicia 310 (e.g., a displayed weather pattern, a displayed windshear event, etc.) on display 220.

In some cases, first indication 306 and second indication 308 may be opposites, i.e., second indication 308 is the absence of first indication 306, or vice versa. Such a configuration may be used if only the transmission status of the PWS system is conveyed by display 220 or if combined statuses are used. For example, first indication 306 may be an icon that indicates that the PWS system is transmitting while the aircraft is grounded and second indication 308 may be the absence of the icon, indicating that the PWS system is not transmitting or that the aircraft is airborne. In other embodiments, additional indications may be provided to convey combined information about the transmission status of the PWS system and one or more other aircraft parameters.

In FIG. 3C, audio device 230 is shown to transition from providing a first indication 312 to providing a second indication 314, based on the transmission status of the PWS system. Audio device 230 may be a speaker, a buzzer, an alarm, any other device that produces noise, or a combination thereof. Indications 312, 314 may also be any number of sounds, the absence of sound, or any combination thereof. For example, first indication 312 may be a tone or series of tones that indicate that the PWS system is transmitting and second indication 314 may be the removal of the tones to indicate when the PWS system is no longer transmitting. In another example, first indication 312 may be a verbal message (e.g., "Windshear radar is transmitting," "PWS is on," etc.) that is repeated periodically while the PWS system is transmitting. In such a case, second indication 314 may be an end to the periodic messages, to indicate that the PWS system has stopped transmitting.

Figure 4:
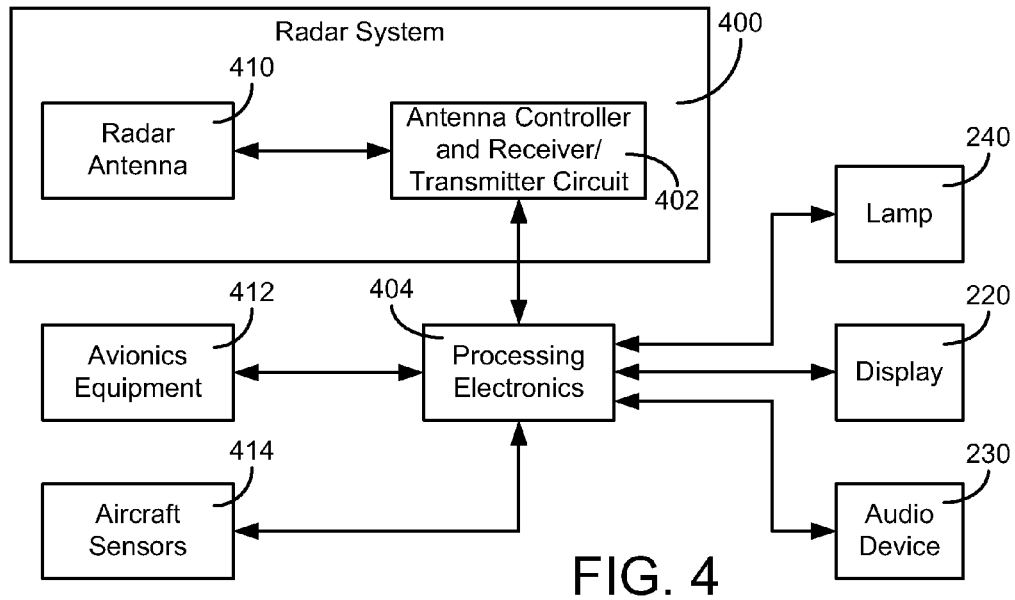
FIG. 4 is a general schematic block diagram of an aircraft radar system, according to another exemplary embodiment.

Referring now to FIG. 4, a block diagram of radar system 400 is shown, according to an exemplary embodiment. Radar system 400 is installed on aircraft 102 and may be used by the various detection systems of aircraft 102 to detect hazardous conditions. For example, radar system 400 may be used by a weather detection system to detect the presence of weather, a PWS system to detect a windshear condition, or by other radar detection systems of aircraft 102.

Radar system 400 is shown to include a radar antenna 410 connected (e.g., directly, indirectly) to an antenna controller and receiver/transmitter circuit 402. Antenna controller and receiver/transmitter circuit 402 may include any number of mechanical or electrical circuitry components or modules for steering a radar beam generated by radar antenna 410. For example, circuit 402 may be configured to mechanically tilt radar antenna 410 in a first direction while mechanically rotating radar antenna 410 in a second direction. In other embodiments, a radar beam may be electronically swept along a first axis and mechanically swept along a second axis. In yet other embodiments, the radar beam may be entirely electronically steered (e.g., by electronically adjusting the phase of signals provided from adjacent apertures in radar antenna 410, etc.). Circuit 402 may be configured to conduct the actual signal generation that results in a radar beam being provided from radar antenna 410 and to conduct the reception of returns received at radar antenna 410.

Radar return data is provided from circuit 402 to processing electronics 404 for data processing. For example, processing electronics 404 may use the radar return data to determine if a hazardous condition has been detected or is likely to exists. Processing electronics 404 may also be configured to provide control signals or control logic to circuit 402. For example, depending on pilot or situational inputs, processing electronics 404 may be configured to cause circuit 402 to change behavior or radar beam patterns. In other words, processing electronics 404 may include the processing logic for operating radar system 400.

Processing electronics 404 are further shown in communication with aircraft sensors 414. In general, sensors 414 may be any number of sensors that measure aircraft parameters related to the state of aircraft 102. For example, sensors 414 may include temperature sensors, humidity sensors, infrared sensors, altitude sensors, pressure sensors, fuel gauges, airspeed sensors, throttle position sensors, ground speed sensors, pitot-static tubes, a gyroscope, a global positioning system (GPS), or any other aircraft-mounted sensors that may be used to provide data to processing electronics 404. It should be appreciated that sensors 414 (or any other component shown connected to processing electronics 404) may be indirectly or directly connected to the processing electronics 404. For example, processing electronics 404 may receive a temperature reading directly from a temperature sensor and a throttle position indirectly from a position sensor via an engine controller.

Processing electronics 404 are further shown in communication with avionics equipment 412. In general, avionics equipment 412 may include other electronic control systems in aircraft 102. For example, avionics equipment 412 may include a flight management system, a navigation system, a backup navigation system, or another aircraft system configured to provide inputs to processing electronics 404. For example, avionics equipment 412 may include the landing gear system of aircraft 102 and provide information such as whether or not the landing gear is deployed, a weight on wheels determination, or other parameters to processing electronics 404. In another example, avionics equipment 412 may provide controls inputs, such as a desired throttle or power level to processing electronics 404.

Processing electronics 404 are additionally shown in communication with a number of user interface devices, such as display 220, audio device 230, and lamp 240. For example, processing electronics 404 may provide information about a detected hazard or other radar-related information to display 220, audio device 230, and lamp 240. In some cases, processing electronics 404 may also receive input from a user interface device. For example, processing electronics 404 may receive a request for a different radar view or an updated trajectory via display 220.

In some embodiments, processing electronics 404 may determine if the PWS system of aircraft 102 is active and radar antenna 410 is transmitting. Processing electronics 404 may also provide an indication of the determination to lamp 240, display 220, or audio device 230. In other embodiments, processing electronics 404 may combine the transmission determination with one or more other parameters related to the operational state of the aircraft (e.g., whether aircraft 102 is on the ground, airborne, idling, about to take off, etc.).

Figure 5:
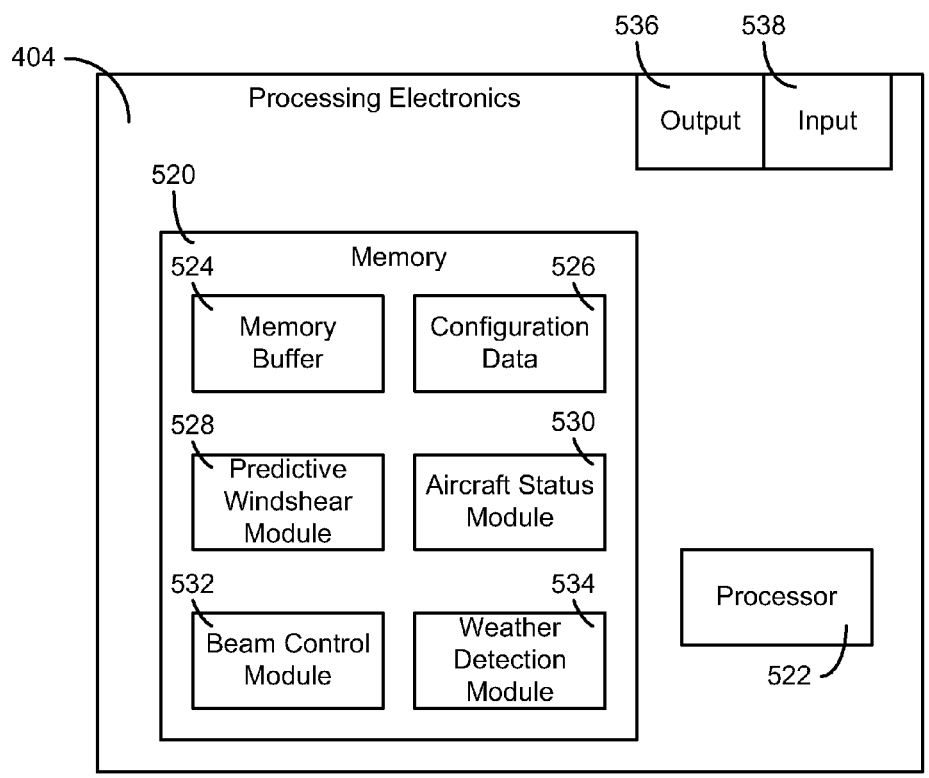
FIG. 5 is a general schematic block diagram of the processing electronics of the aircraft radar system of FIG. 4, according to an exemplary embodiment.

Referring to FIG. 5, a detailed block diagram of processing electronics 404 of FIG. 4 is shown, according to an exemplary embodiment. Processing electronics 404 includes a memory 520 and processor 522. Processor 522 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 522 is configured to execute computer code stored in memory 520 to complete and facilitate the activities described herein. Memory 520 can be any volatile or non-volatile computer-readable medium capable of storing data or computer code relating to the activities described herein. For example, memory 520 is shown to include modules 528-534 which are computer code modules (e.g., executable code, object code, source code, script code, machine code, etc.) configured for execution by processor 522. When executed by processor 522, processing electronics 404 is configured to complete the activities described herein. Processing electronics includes hardware circuitry for supporting the execution of the computer code of modules 528-534. For example, processing electronics 404 includes hardware interfaces (e.g., output 536) for communicating control signals (e.g., analog, digital) from processing electronics 404 to circuit 402 and to provide signals to other devices such as display 220, audio devices 230, and lamp 240. Processing electronics 404 may also include an input 538 for receiving, for example, radar return data from circuit 402, feedback signals from circuit 402, or for receiving data from other devices (e.g., display 220, etc.) or other systems.

Memory 520 includes a memory buffer 524 for receiving radar return data and other data. The radar return data may be stored in memory buffer 524 until buffer 524 is accessed for data. For example, a forward looking terrain alerting algorithm, an object detection module, predictive windshear module 528, weather detection module 534, or another process that utilizes radar return data may access buffer 524. The radar return data stored in memory 520 may be stored according to a variety of schemes or formats. For example, the radar return data may be stored in an x,y or x,y,z format, a heading-up format, a north-up format, a latitude-longitude format, or any other suitable format for storing spatial-relative information. Memory buffer 524 may also store airplane parameters related to the operational state of aircraft 102 received from aircraft sensors 414 or avionics equipment 412.

Memory 520 further includes configuration data 526. Configuration data 526 includes data relating to radar system 400. For example, configuration data 526 may include beam pattern data which may be data that beam control module 532 can interpret to determine how to command circuit 402 to sweep a radar beam. For example, configuration data 526 may include information regarding maximum and minimum azimuth angles of horizontal radar beam sweeps, azimuth angles at which to conduct vertical radar beam sweeps, timing information, speed of movement information, and the like. In some embodiments, configuration data 526 may also include other user or computer defined parameters that alter the functionality of processing circuit 404. For example, configuration data 526 may include a parameter that defines how information from radar system 400 is presented via display 220, audio device 230, and lamp 240.

Memory 520 is also shown to include weather detection module 534 which includes logic for using radar returns in memory buffer 524 to conduct one or more determinations relating to weather. For example, weather detection module 534 may be configured to determine a gain level or other display setting for display of the radar returns on a weather radar display (e.g., display 220). Weather detection module 534 may further be configured to distinguish terrain returns from weather returns. Weather detection module 534 may also determine when weather is hazardous, determine characteristics of weather, or to conduct any other processing steps (e.g., filtering) relative to radar return data used for weather display or warning in aircraft 102.

Memory 520 is further shown to include beam control module 532. Beam control module 532 may be an algorithm for commanding circuit 402 to sweep a radar beam. Beam control module 532 may be used, for example, to send one or more analog or digital control signals to circuit 402. The control signals may be, for example, an instruction to move the antenna mechanically, an instruction to conduct an electronic beam sweep in a certain way, an instruction to move the radar beam to the left by five degrees, etc. Beam control module 532 may be configured to control timing of the beam sweeps or movements relative to aircraft speed, flight path information, transmission or reception characteristics from radar system 400 or otherwise. Beam control module 532 may receive data from configuration data 526 for configuring the movement of the radar beam.

Memory 520 also includes aircraft status module 530 which includes logic for using aircraft parameters in memory buffer 524 to determine an operational state of the aircraft. In general, an operational state may be any information corresponding to the various stages of operation of the aircraft during use. Operational states may be broadly defined or more specifically defined. For example, operational states may be broadly defined as simply "on the ground" versus "airborne." Such a determination may be made using information regarding whether or not the landing gear is deployed, if there is weight on the wheels, or any other information indicative of whether or not the aircraft is airborne. In another example, operational states may be more specifically defined, such as "on the ground and at the gate," "on the ground and ready to leave the gate," "taxiing," etc. Such determinations may incorporate even more aircraft parameters, such as the throttle, whether the engines are running, the speed of the aircraft, or any other parameter related to the operation of the aircraft.

Memory 520 further includes a predictive windshear module 528 which includes logic for using radar returns in memory buffer 524 to detect the presence or absence of microbursts or windshear. Predictive windshear module 528 may include or be coupled to a weather database or other memory including weather data such as microburst downflow models. Predictive windshear module 528 may be configured to use radar return information or information derived by radar return information with weather data stored in a weather database or other memory.

Predictive windshear module 528 may also be configured to automatically activate radar system 400, based on the operational state determined by aircraft status module 530 (e.g., during takeoff, during landing, etc.). For example, predictive windshear module 528 may automatically activate radar 400 during a landing when aircraft 102 reaches a given altitude threshold. In another example, predictive windshear module 528 may automatically activate radar system 400 during takeoff provided certain aircraft conditions or qualifiers are met. For example, aircraft status module 530 may determine that aircraft 102 is about to take off based on a weight on wheels determination, the engine throttle, the velocity of the aircraft, or any other aircraft parameter associated with takeoffs.

In some embodiments, predictive windshear module 528 provide an indication of the transmission status of radar system 400 to one or more user interface devices, when radar system 400 is used for PWS detection. For example, processing electronics 404 may provide an indication of the transmission status of radar system 400 for PWS detection to display 220, audio device 230, or lamp 240. Predictive windshear module 528 may, for example, receive the transmission status of radar antenna 410 from circuit 402 and use the transmission status to generate an indication of the status for a user interface device. In some cases, predictive windshear module 528 may also use other factors to determine the appropriate transmission status indication. For example, predictive windshear module 528 may provide a combined indication to a user interface device, based on the transmission status of radar system 400 and on an aircraft operational state determined by aircraft status module 530. For example, combined indications may combine information as to whether or not radar system 400 is transmitting for PWS detection with other information such as: whether aircraft 102 is airborne or on the ground, whether aircraft 102 is above or below a certain above-ground altitude, whether aircraft 102 is at the gate or beginning its takeoff, and other aircraft operational states.

In one exemplary embodiment, display 220 may be a radar display that utilizes a standard radar display bus protocol, such as those promulgated by the U.S. Department of Defense or by Aeronautical Radio, Inc. (e.g., the ARINC 708 protocol, the ARINC 453 protocol, etc.). For example, the ARINC 708 protocol utilizes an asynchronous, Manchester encoded signal with a radar display bus. Predictive windshear module 528 may, for example, utilize such a protocol by setting a bit (e.g., a PWS transmitting bit) on the radar display bus whenever radar system 400 is transmitting for windshear detection. This bit may be used by display 220 to indicate that radar system 400 is transmitting to detect windshear. The PWS transmitting bit may also be combined (e.g., using a logical AND, OR, etc.) with another bit that is used to indicate radar transmission by the weather detection system and/or with a bit used to indicate if aircraft 102 is still on the ground.

Figure 6:
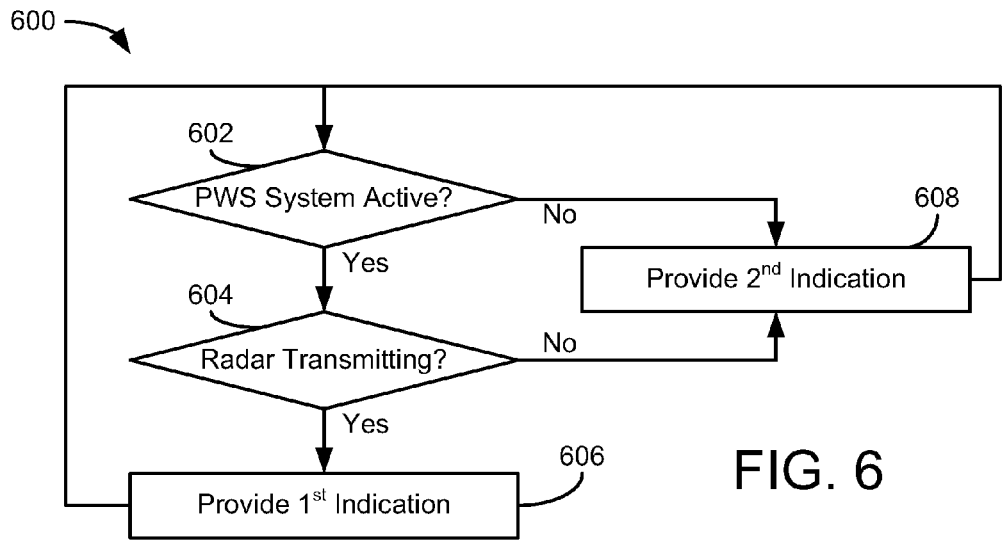
FIG. 6 is a flow chart of a process for indicating an aircraft PWS transmission status, according to an exemplary embodiment.

Referring to FIG. 6, a flowchart of a process 600 for indicating an aircraft PWS transmission status is shown, according to an exemplary embodiment. Process 600 utilizes a simple classification approach to the status of the PWS system, i.e., whether or not the radar of the PWS system is transmitting.

Process 600 is shown to include determining whether an aircraft PWS system is active (step 602). In one embodiment, the determination in step 602 may be made based on a received input (e.g., a switch, button, or other input device used to activate the PWS system). In another embodiment, the determination in step 602 may be made automatically, based on the operational state of the aircraft. For example, if the PWS system is configured to automatically activate under certain conditions, such as takeoffs and landings, the PWS system itself may determine when it self-activates.

Process 600 is also shown to include determining if the radar is transmitting (step 604). Even if the PWS system is active, the radar may not yet be transmitting. For example, the PWS system may be set to "Auto" in some cases, meaning that the actual radar transmissions are automatically activated based on one or more aircraft parameters. In some embodiments, the determination in step 604 may be made based on a radar transmit command used to activate the radar or may even be based on the receipt of radar returns after the radar has been activated.

Process 600 is further shown to include providing a first indication (step 606). If the PWS system is active and the radar is transmitting, a first indication may be provided to a user interface device to convey the status of the PWS system to a user. This allows a user to determine if the PWS system is functioning properly, to warn others to stay back from the radar, to determine if the PWS should be forced to deactivate, and to perform other functions.

Process 600 is additionally shown to include proving a second indication (step 608). If the PWS system is not active and transmitting, a second indication may be provided to a user interface device. In some embodiments, the first and second indications may be opposed, i.e., one indication is the presence or absence of the other. In other embodiments, the first and second indications may be separate and distinct indications.

In some embodiments, process 600 may be repeated to update the provided indication. In such a case, process 600 may be repeated continuously or periodically (e.g., performing steps 602 and 604 only at discrete times). For example, the determinations in steps 602 and 604 may be made every five second, every minute, or at any other predefined time interval.

Figure 7:
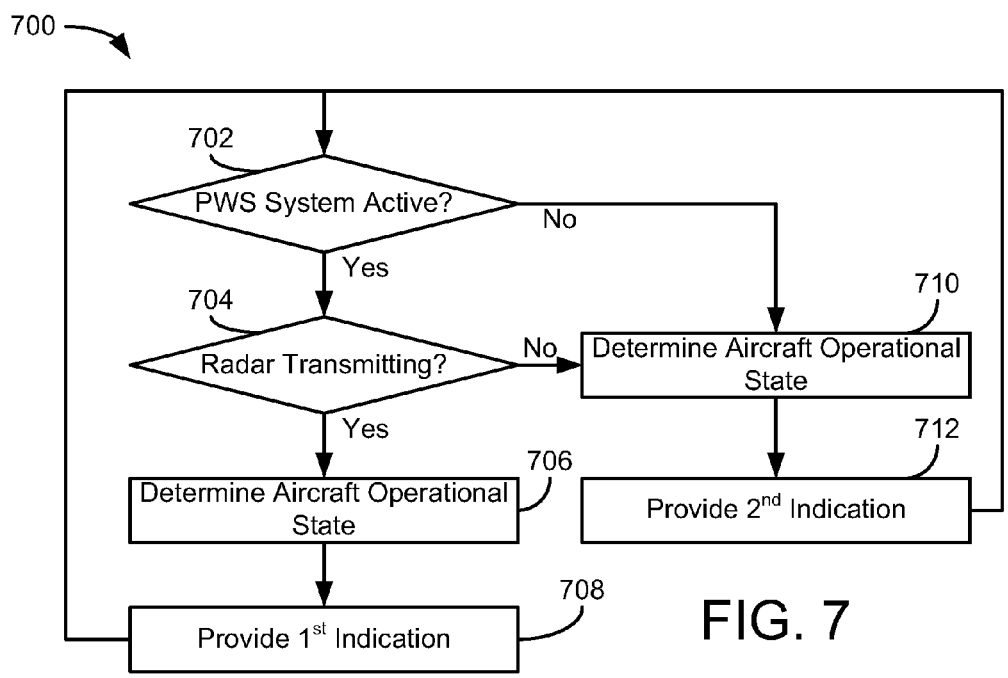
FIG. 7 is a flow chart of a process for providing a combined indication of PWS transmission status and aircraft operational state, according to an exemplary embodiment.

Referring to FIG. 7, a flow chart of a process 700 for providing a combined indication of PWS transmission status and aircraft operational state is shown, according to an exemplary embodiment. Process 700 utilizes a more specific classification approach than that of process 600 by combining the transmission status of the PWS system with the operational state of the aircraft. Process 700 may be used, for example, to indicate the transmission status of the PWS system only at certain times (e.g., the airplane is on the ground, the airplane is at the gate, etc.).

Process 700 includes determining whether the PWS system is active (step 702). This determination may be made in a matter similar to that of step 602. For example, the determination in step 702 may be made based on a received input or may be made automatically, based on a system parameter.

Process 700 also includes determining whether the radar system is transmitting (step 704). This determination may also be made in a manner similar to that of step 604. For example, the determination in step 704 may be made based on a radar transmit command used to activate the radar or may be based on the receipt of radar returns after the radar has been activated, according to various embodiments.

Process 700 additionally includes determining an aircraft operational state if the PWS system is active and transmitting (step 706). The aircraft operational state may be based, for example, on whether the aircraft is on the ground or airborne, whether the aircraft is taxiing or at the gate, whether the aircraft is above or below a certain above-ground altitude, or any other state that specifies the operation of the aircraft. In some embodiments, the determination in step 706 may be a binary decision (e.g., is the aircraft grounded or airborne, etc.). In other embodiments, the determination in step 706 may have three or more potential outcomes (e.g., the aircraft is stopped, the aircraft is about to takeoff, the aircraft is in the process of landing, etc.).

Process 700 further includes providing a first indication if the PWS system is active and the radar is transmitting (step 708). Here, the first indication is based in part on the aircraft operational state determined in step 706. For example, the first indication may convey that the PWS system is active and transmitting while the aircraft is on the ground. In this way, the possible operational states from decision step 706 may be used to tailor when an indication based on the PWS transmission status is provided to a user interface device.

Process 700 also includes determining an aircraft operational state if the PWS system is not active or not transmitting (step 710). Similar to step 706, the aircraft operational state may be based, for example, on whether the aircraft is on the ground or airborne, whether the aircraft is taxiing or at the gate, whether the aircraft is above or below a certain above-ground altitude, or any other state that specifies the operation of the aircraft.

In some embodiments, the determinations in steps 706 and 710 are the same. For example, steps 706 and step 710 may determine whether or not the aircraft is on the ground. In other embodiments, the determination in step 710 differs from that of step 706. For example, step 706 may determine whether or not the aircraft is on the ground and step 710 may determine if the aircraft is above or below a certain above-ground altitude. This allows further control over when an indication that the PWS system is not transmitting should be conveyed to a user interface device.

Process 700 further includes providing a second indication if the PWS system is not active or the radar is not transmitting (step 712). Here, the second indication is based in part on the aircraft operational state determined in step 710. If the determinations in steps 706 and 710 are identical, the first and second indications may also be related. However, if the determinations in steps 706 and 710 differ, the second indication may be uncorrelated to that of the first indication. For example, the first indication provided in step 708 may signify that the PWS system is active and transmitting while the aircraft is on the ground, while the second indication provided in step 712 may signify that the PWS system is not active or not transmitting while the aircraft is airbore below an altitude of 2300 feet. In this way, any number of configurations of different status indications may be provided, based on the transmission status of the PWS system.

In some embodiments, process 700 may be repeated to update the provided indication. In such a case, process 700 may be repeated continuously or periodically (e.g., performing the steps of process 700 only at discrete times). In further embodiments, the determinations made in steps 706 and 710 may differ, based on how many times process 700 has been repeated. For example, step 710 may determine whether the aircraft is airborne for the first three times process 700 is repeated and may determine whether the aircraft is above a certain altitude thereafter.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of providing a transmission status of a predictive windshear radar system for an aircraft, the method comprising:
   determining if the predictive windshear radar system is transmitting; and
   providing an indication of a result of the determining step to a user interface device, wherein the indication is based on a predictive windshear status bit provided by the predictive windshear radar system to a display bus of a display, and wherein the predictive windshear status bit is logically combined with a weather radar status bit.

2. A method of providing a transmission status of a predictive windshear radar system for an aircraft, the method comprising:
   determining if the predictive windshear radar system is transmitting; and providing a first indication of a result of the determining step to a user interface device, wherein providing the first indication of a result of the determining step comprises:

determining whether the aircraft is on the ground; and providing the first indication when the aircraft is on the ground and the windshear radar system is transmitting.

3. The method of claim 2, further comprises providing a second indication when the aircraft is not on the ground and the predictive windshear system is transmitting.

4. The method of claim 3, wherein the first indication has a different color pattern than the second indication.

5. The method of claim 2, wherein determining whether the aircraft is on the ground comprises determining a weight on wheels value for the aircraft.

6. The method of claim 1, wherein the user interface device comprises at least one of a display screen, a lamp, or an audio device.

7. The method of claim 1, wherein the predictive windshear radar system is automatically activated based on one or more aircraft parameters.

8. The method of claim 2, wherein the first indication is based on a predictive windshear status bit provided by the predictive windshear radar system to the display bus of a display, and wherein the predictive windshear status bit is logically combined with a weather radar status bit.

9. A system for an aircraft comprising processing electronics configured to provide an indication of whether a predictive windshear radar system is transmitting to a user interface device, wherein the user interface device is a display screen having a display bus, wherein the indication is based on a predictive windshear status bit provided by the predictive windshear radar system to the display bus, and wherein the predictive windshear status bit is logically combined with a weather radar status bit.

10. A system for an aircraft comprising processing electronics configured to provide a first indication of whether a predictive windshear radar system is transmitting to a user interface device, wherein the processing electronics are further configured to determine whether the aircraft is on the ground; and wherein the first indication indicates that the aircraft is on the ground and the predictive windshear radar system is transmitting.

11. The system of claim 10, wherein the processing electronics are further configured to provide a second indication to the user interface device, wherein the second indication indicates that the aircraft is not on the ground and the predictive windshear system is transmitting.

12. The system of claim 10, wherein the processing electronics are configured to determine whether the aircraft is on the ground using a weight on wheels value for the aircraft.

13. The system of claim 9, wherein the user interface device comprises at least one of a display screen, a lamp, or an audio device.

14. The system of claim 9, wherein the predictive windshear radar system is automatically activated based on one or more aircraft parameters.

15. The system of claim 10, wherein the user interface device is a display screen having a display bus, wherein the indication is based on a predictive windshear status bit provided by the predictive windshear radar system to the display bus, and wherein the predictive windshear status bit is logically combined with a weather radar status bit.

16. The system of claim 10, wherein the processing electronics are configured to not provide a second indication that indicates that the predictive windshear system is transmitting and the aircraft is not on the ground.

17. One or more computer-readable media having instructions stored therein, the instructions being executable by one or more processors to execute a method comprising:

determining if a predictive windshear radar system is transmitting; and providing an indication of a result of the determining step to a user interface device wherein the method further comprises determining if the aircraft is on the ground, and wherein the indication indicates whether the aircraft is on the ground.

18. The one or more computer-readable media of claim 17, wherein the indication is based on a predictive windshear status bit provided by the predictive windshear radar system to a display bus of a display, and wherein the predictive windshear status bit is logically combined with a weather radar status bit.

19. The one or more computer-readable media of claim 17, wherein the user interface device comprises at least one of a display screen, a lamp, or an audio device.

20. The one or more computer-readable media of claim 19, wherein the predictive windshear radar system is automatically activated based on one or more aircraft parameters.

* * * * *